Jan. 3, 1967   L. A. KLEVEN   3,296,572
STANDARD THERMOMETER
Filed Oct. 18, 1962   2 Sheets-Sheet 1
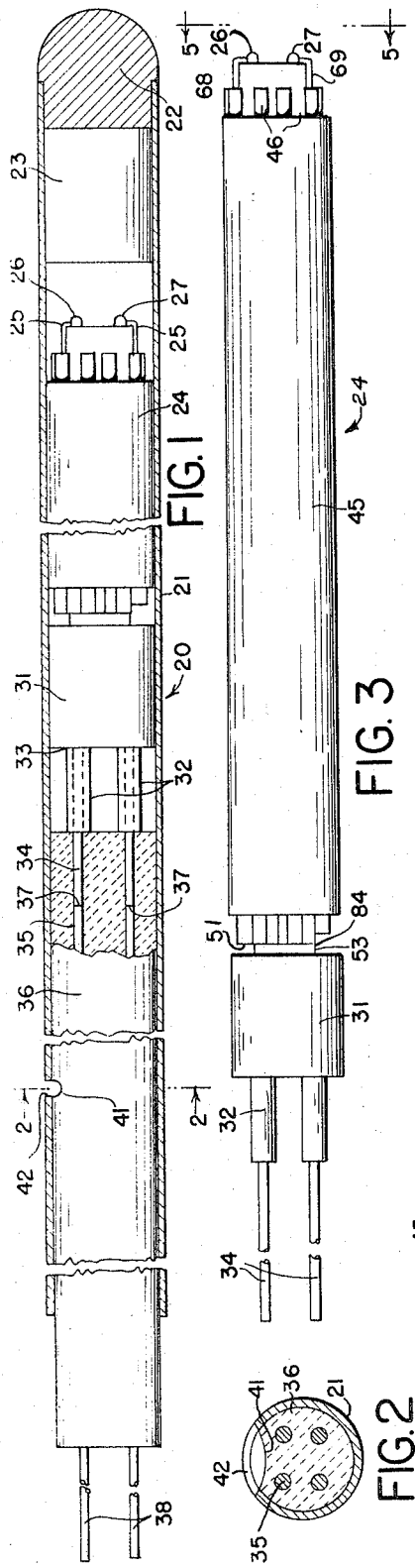
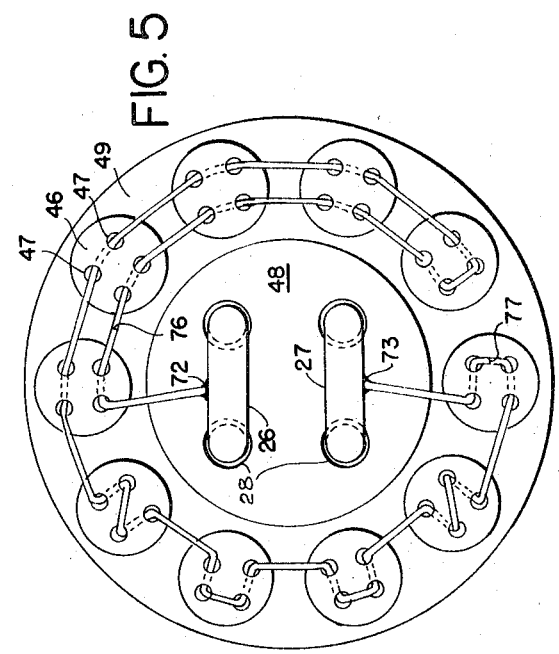
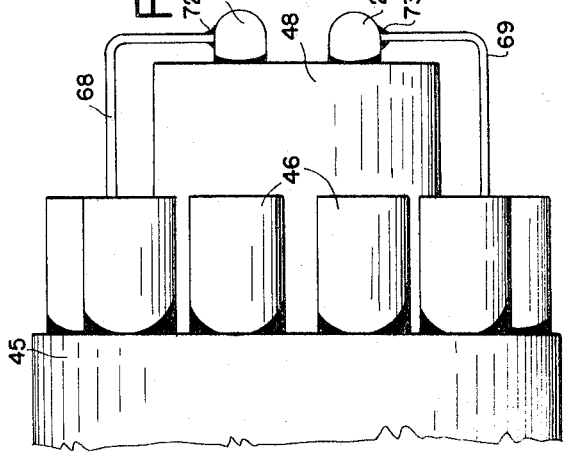
INVENTOR.
LOWELL A. KLEVEN
BY
Dugger, Braddock, Johnson & Westman
ATTORNEYS

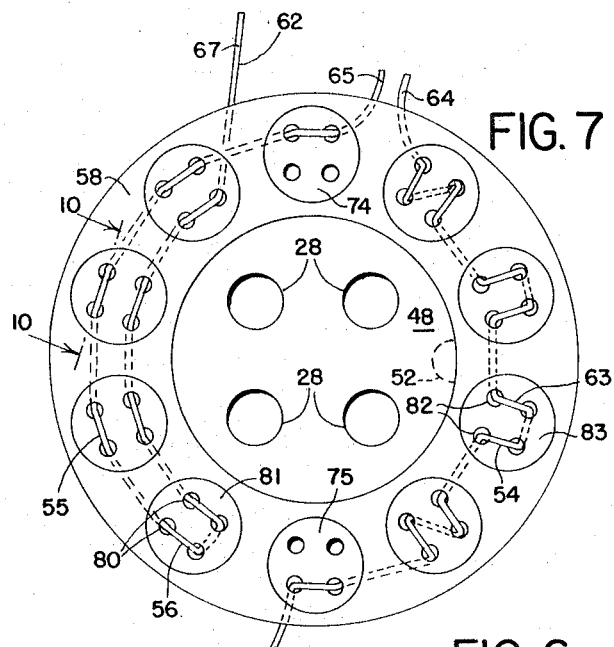
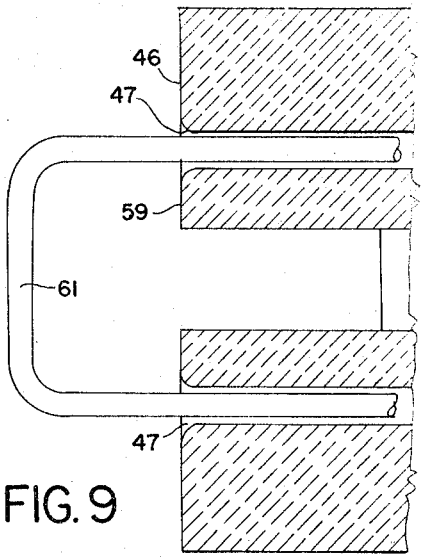
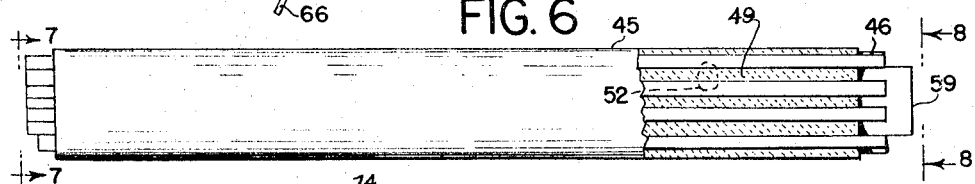
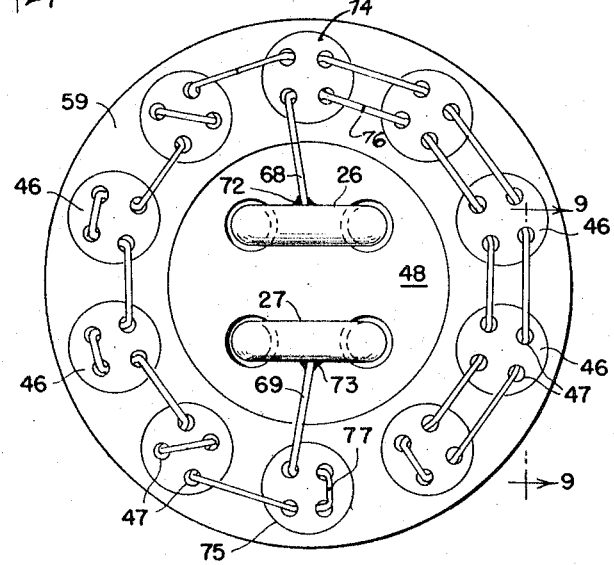
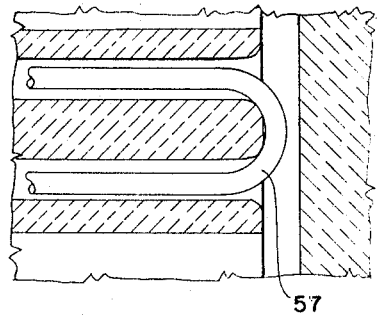

United States Patent Office 3,296,572
Patented Jan. 3, 1967

3,296,572
STANDARD THERMOMETER
Lowell A. Kleven, Minneapolis, Minn., assignor to Rosemount Engineering Company, Minneapolis, Minn., a corporation of Minnesota
Filed Oct. 18, 1962, Ser. No. 231,434
14 Claims. (Cl. 338—28)

The present invention has relation to thermometers and more particularly to a resistance thermometer wherein drift in the temperature-resistance calibration is virtually eliminated, making the thermometer usable as a standard thermometer for calibrating other instruments.

At the present time the National Bureau of Standards calibrates platinum wire resistance thermometers for the general public. The standard thermometers calibrated and used by the bureau are fragile, and must be handled with care. They also exhibit undesirably high self-heating characteristics.

It is important in the use of a wire resistance temperature sensor that no drift in the temperature-resistance calibration occurs. The sensing wire must be entirely strain free so that any change in resistance of the wire is caused only by temperature change and not by mechanical strain.

In common types of platinum wire resistance thermometers the wire is wound around some type of supporting member in as strain free manner as possible. For example, one type uses a flat strip of mica with the wire wound around it and the unit encased in a thin metal shell. Even this type of winding will cause some strain on the wire and consequently objectionable drift.

The device of the present invention presents a unique wound wire resistance thermometer in which the resistance coil is supported virtually strain free. In addition the unit is relatively resistant to vibration and can be used in many applications where the present standard thermometers now available would not be satisfactory.

The device comprises a cylindrical member having a plurality of small diameter longitudinally extending holes. The resistance wire is threaded through the holes, being looped at the ends of the cylinder from one hole to the other. Thus practically the entire length of the resistance wire is supported on the interior surfaces of the holes. The loops at the end will permit the wire to expand and contract without causing a mechanical strain in the wire. As shown, the support cylinder is made of a suitable ceramic material that readily conducts heat to the wire. As a large portion of the wire surface contacts the ceramic material quick response is possible.

The cylinder is inserted in an outer metal sheath, if desired and the usual lead wires and bridge-type sensing circuitry can be used.

It is an object of the present invention to present a resistance wire standard thermometer.

It is a further object of the present invention to present a standard thermometer wherein the resistance wire is supported so as to be entirely free of mechanical strain.

It is a further object of the present invention to present a standard thermometer that can be used under high pressure environments.

It is a further object of the present invention to present a standard thermometer that exhibits very small self-heating characteristics.

It is a still further object of the present invention to present a standard thermometer that can be made under commercial manufacturing conditions and will still give highly accurate temperature measurements over a wide range of temperatures.

Other and further objects are those inherent in the invention herein illustrated, described, and claimed, and will become apparent as the description proceeds.

To the accomplishment of the aforegoing and related ends, this invention then comprises features hereinafter fully described and particularly pointed out in the claims, the following description setting forth in detail certain illustrative embodiments of the invention, these being indicative, however of but a few of the various ways in which the principles of the invention may be employed.

The invention herein being further described with reference to the drawings wherein:

FIG. 1 is a vertical sectional view of an outer housing of a standard thermometer made according to the present invention showing the various components in place within the housing;

FIG. 2 is a vertical sectional view taken as on line 2—2 in FIG. 1;

FIG. 3 is a side elevational view of a sensing element used in the device of FIG. 1;

FIG. 4 is a fragmentary enlarged side elevational view of an end portion of the sensing element of FIG. 3 showing lead wires attached to the resistance unit;

FIG. 5 is an end elevational view taken as on line 5—5 in FIG. 3 and showing the attachment of lead wires to the wire resistance unit;

FIG. 6 is a side elevational view of a support and tube assembly for the wire resistance unit used with a standard thermometer of the invention, with parts in section and parts broken away;

FIG. 7 is an elevational view of the device of FIG. 6 taken as on line 7—7 in FIG. 6 and showing a wire resistance element threaded in place;

FIG. 8 is an end elevational view taken as on line 8—8 in FIG. 6 shown with the resistance wire in place in the support;

FIG. 9 is a fragmentary enlarged view taken as on line 9—9 in FIG. 8; and

FIG. 10 is a fragmentary enlarged sectional view taken as on line 10—10 in FIG. 7.

Referring to the drawings and the numerals of reference thereon, a standard thermometer assembly illustrated generally at 20 includes an outer housing 21 which is tubular and has an end cap 22 welded thereto. A button 23 of ceramic material is positioned at the end of the tube 21 against end cap 22.

The temperature sensing element assembly 24 is positioned within the tube and is spaced from the end button 23. The element assembly holds a resistance wire 25 which is connected to first and second hairpin-like or U-shaped platinum lead wires 26 and 27 respectively. The platinum lead wires extend through provided holes 28 in the element assembly and also extend through provided holes in a ceramic button 31 which is slidably mounted within the outer housing 21. The leads extend outwardly from the button and each has a platinum collar 32 positioned thereon. The lead wires are positioned with the closed end of the U tight against the end surface of the element assembly and the collars are abutted against the ceramic button as at 33 and are then fused in place onto the platinum lead wires. The collars hold the button and element assembly in contiguous contact and prevent movement of the lead wires with respect to the support assembly. Outer end portions 34 of the platinum lead wires extend into provided holes 35 of a ceramic barrel 36. The barrel 36 is mounted within the outer housing 21 and is positioned against the collars. The outer ends 34 of the platinum lead wires are fused as at 37 to gold lead wires 38 which extend through the ceramic barrel and out to suitable electrical circuitry (not shown). The gold wires are mechanically secured to the barrel at the outer end thereof.

The ceramic barrel 36 has a keyway 41 which alines with a keyway 42 in the outer housing 21. The keyways are filled with a key metal which prevents the ceramic barrel from sliding longitudinally with respect to the housing once it is assembled. As can be seen, the ceramic barrel 36 is fastened and the rest of the units are slidably mounted in the tube. A space is provided between button 23 and the element assembly 24 for changes in length of the assembly due to thermal expansion of the lead wires, which may change length at a different rate from the other parts.

Referring specifically to FIGS. 3 through 11, the construction of the sensing element assembly 24 is more clearly shown. The sensing element assembly 24 includes an element support 45. The element support is comprised of a plurality of ceramic support cylinders 46, each with four holes 47 extending longitudinally therethrough. A center cylinder 48 is provided to support the lead wires 26 and 27. The support cylinders 46 are arranged radially outwardly from the center cylinder 48. The support cylinders 46 are fixedly held in place adjacent the center cylinder 48 with a filling 49 of gold or other suitable metal. The element support 45 is cast as a unit through investment or "lost wax" casting procedures, which are well known in the art.

The multiple ceramic support cylinders 46, ten as shown, are arranged adjacent the outer surface of the element support and each has four holes 47 as shown. The cylinders are cast in place.

The center cylinder 48 has a plurality of dimples 52, illustrated in dotted lines in FIGS. 6 and 7. When the support cylinders 46 are cast in place the dimples will fill with the casting metal and thus the center tube will be held firmly in the gold. The support cylinders 46 have surface irregularities which make the gold adhere thereto so that they are firmly held in place also.

As can be seen in FIG. 3 the ceramic button 31 has a boss 53 which abuts against the first end 51 of the inner tube 48. The boss is of the same diameter as the circle intersecting all four of the holes for the lead wires. This prevents interference between the button and the element or resistance wires wound in the support cylinders 46, which are spaced outwardly from the boss. The wire can move slightly rearwardly without interference. This permits expansion or shifting of the resistance wire without inducing strain.

The ceramic button is then held by the collars 32 which are fused to the lead wires 26 and 27. The ceramic button is held against the center cylinder 48 which in turn holds the entire element assembly together.

The resistance wire 25 is comprised of two separate lengths 54 and 55, respectively as seen in FIG. 7. The wire is wound through the holes 47 of the ceramic cylinders 46 as shown. The length 55 is started approximately in the middle thereof, as at bend 56, and then is wound through the holes of adjacent cylinders as shown. The wire is pulled tight in the loops between holes at a first end 58 of the element support adjacent the ceramic button 31 as shown at 57 in FIG. 10. At a second end 59 of the element support, opposite from the ceramic button 31 the wire is bent as shown in FIG. 9 between the two holes 47. As can be seen the wire has a straight section 61 extending between and at right angles to the two longitudinal lengths which go through the holes 47. There is space between length 61 and the end of the ceramic support cylinders. The bend shown is typical of the bends in the wire on this end of the unit.

It should be noted that the platinum wires extend between the holes in the same cylinder 46 at first end 58 of the element support, which is adjacent the centering button, and are pulled tight at this end. The platinum wires extend between holes in adjacent cylinders 46 at the second end 59 near button 23 by end cap 22. It is at the second end that the wires are looped as shown in FIG. 9 and clearance is provided.

Referring again to FIGS. 7 and 8, it can be seen that the wire 55 is wound so that from the starting point 56, in the center of the wire, both ends of the wire extend in the same direction around the element support and terminate adjacent the top of the element support as shown at 62 in FIG. 7. In other words, all of the loops between the holes in individual ceramic cylinders 46 are at one end, the end 58 adjacent the ceramic button 31, and all of the loops between adjacent cylinders are at the opposite end 59. Also, there are two strands or loops extending between each of the adjacent cylinders 46 through which wire 55 is threaded.

The second length 54 of resistance wire is started at loop 63 and is then wound through the various holes 47 in the cylinder 46. Whereas both ends of wire 55 were wound in one direction around the periphery of the tube, opposite end portions of wire 54 are wound in opposite directions. The wire may be wound in any random pattern through the holes 47 as long as the loops extending between holes in adjacent cylinders 46 are all on the end 59 of the element support.

The wire 54 is wound from the center thereof with the end portions extending in opposite direction from the starting point, so that a first end portion 64 thereof meets a first end portion 65 of the wire 55 between adjacent cylinders at the end 59 of the element support. The second end portion 66 of wire 54, is, when initially threaded, diametrically opposed to a second end portion 67 of the wire 55.

The hairpin-type lead wires 26 and 27 are installed by inserting them through the holes 28 of the center cylinder 48. The lead wires 26 and 27, as stated previously, are also made of platinum. The lead wires 26 and 27 have junction wires 68 and 69, respectively, fused thereto at the closed or loop ends thereof, as shown at 72 and 73, respectively.

As shown in FIG. 8, the lead junction wires 68 and 69 are threaded through open holes 47 of ceramic cylinders 74 and 75, respectively. The tubes 74 and 75 are diametrically aligned on opposite sides of the element support and are adjacent their respective hairpin lead wires 26 and 27. The junction wire 68 is fused to second end 67 of wire 55 as at 76. The junction wire 69 is fused to second end 66 of wire 54 as at 77.

The junction wires 68 and 69 may be of different size from the wires 54 and 55 in order to obtain the proper resistance value of the sensing element.

It should be noted that the loops having straight portion 61 between adjacent cylinders 46 are loose so that the wire is free to move longitudinally within the holes 47 of the cylinder. At no point is the wire restrained.

The adjustment of the resistance of the unit is accomplished by removing a section of wire and replacing it with an equal length of larger diameter platinum wire or vice versa. If necessary to obtain the proper resistance, a portion of the platinum wire can be omitted. For example the wire 55 could be looped directly between the holes 80, 80 of a cylinder 81, as shown in FIG. 7 or directly between the holes 82, 82 of a cylinder 83. The combination of the holes from which the wire is removed must be by pairs as it is imperative that the loops of wire between adjacent tubes all are at one end of the element support.

As shown, tube 75 is shorter than the rest of the tubes 46. This permits the adjustment of the resistance value of the unit after the ceramic button 31 and collars 32 have been placed on the lead wires. A section of wire can be removed from the short tube and replaced with different diameter wire. The resistance wire is threaded in through the opening indicated at 84 in FIG. 3.

It can thus be seen that the resistance wire or sensing element is freely supported substantially on its entire length by the interior surfaces defining the holes 47 and is free to shift, expand, and generally move slightly without causing strain on the wires. The resistance wire is held only where it joins the lead wires and otherwise is unrestrained and freely supported. It is unsupported for short distances where it is looped between holes. This permits a very accurate calibration of the device and, once calibrated, the resistance-temperature calibrates will not shift. Also the conduction of heat from the outer housing through the ceramic cylinders and to the resistance wire is exceptionally good. A large portion of the resistance wire is contiguous with the interior surfaces of the holes 47 and therefore there is very little temperature lag.

The hairpin lead wires remain stationary with respect to the resistance element support assembly so that they cannot shift to introduce mechanical strain into the resistance wire. Any differential expansion of the lead wires will cause the entire element support assembly to move. Therefore, this does not affect the resistance wire either.

What is claimed is:

1. A temperature sensor of the resistance wire type comprising an element support, said element support being comprised of a center cylindrical member having a plurality of outer support cylinders fixedly attached thereto and extending substantially parallel therewith, said outer support cylinders being arranged annularly around said center cylindrical member, each of said support cylinders having a plurality of holes longitudinal therethrough, a resistance wire threaded through the holes in said cylindrical support members and looped between adjacent holes in the cylindrical support members, said center cylindrical member having four holes defined therethrough, a pair of U-shaped lead wires mounted in said holes in said center cylindrical member, the bend of said U-shaped lead wires being at a second end of said element support and the legs of each wire extending through said center cylindrical member to a first end thereof, opposite ends of said resistance wire being electrically connected to a separate one of said U-shaped lead wires at the bend portion thereof, and means to prevent said lead wires from sliding movement with respect to said center cylindrical member.

2. The combination as specified in claim 1 wherein the bends of said U-shaped lead wires are drawn tightly against the second end surface of said center cylindrical member and wherein said means for preventing movement of said lead wires is comprised as a ceramic button slidably mounted over the legs of the lead wires and abutting against a first end surface of said element support, and a separate collar over each of said lead wires, said collars being fixed to said lead wires in position to retain said ceramic button and said element support in contiguous relationship.

3. The combination as specified in claim 2 wherein the loops of said resistance wire are pulled tight against the first end surface of said support cylinders, and the wire loops are spaced from the end surfaces of said support cylinders at the second end of said support element.

4. The combination as specified in claim 1 wherein said support cylinders are made of suitable ceramic material and are held in place with respect to said center cylindrical member with a suitable metallic material which is bonded in intimate contact with substantially the entire outer surface of each of said support cylinders.

5. A temperature sensor comprising an elongated tubular housing having one closed end, a resistance wire support adjacent said closed end, said resistance wire support being comprised as a cylindrical member having a plurality of longitudinally extending holes, a resistance wire threaded through said holes and being supported by the surfaces defining said holes in said cylindrical member, said resistance wire being looped between adjacent holes at opposite ends of said cylindrical member so that the length of wire in each opening is free to move with respect to said cylindrical support, a pair of substantially U-shaped lead wires each having wire lengths joined together and being mounted through provided holes in said cylindrical member, the joined end of said U-shaped wires being adjacent the closed end of said tube, each end of said resistance wire being electrically and mechanically attached to the joined end of one of said lead wires, said lead wires extending toward a second open end of said tubular housing, a ceramic button slidably mounted over said outwardly extending portions of said lead wires and positioned contiguous to an end surface of said cylindrical member, a separate collar fixedly attached to each of the individual lengths of said lead wires in position to hold the joined portion of each of said lead wires against its adjacent end surface of said cylindrical member and hold said ceramic button contiguous to its adjacent end surface of said cylindrical member, and means to prevent said cylindrical member and said ceramic button from moving toward the open end of said tube past a predetermined point.

6. The combination as specified in claim 5 wherein said means to prevent said cylindrical member from moving toward said open end of said cylinders is comprised as a ceramic barrel slidably mounted over the lengths of said lead wires and positioned to engage said collars, said ceramic barrel being fixedly mounted within said tubular outer member.

7. The combination as specified in claim 6 wherein said cylindrical element support is comprised as a center cylindrical member having holes defined therein to receive the lengths of said lead wires, and a plurality of ceramic cylinders arranged annularly around and spaced radially outwardly from said center cylindrical member, said ceramic cylinders being held in position with a suitable filling of metallic material contiguous to substantially the entire outer surface of each of said ceramic cylinders, each of said ceramic cylinders further being provided with a plurality of longitudinal openings to support said resistance wires.

8. The combination as specified in claim 7 wherein one of said ceramic support cylinders is shorter than the other and is spaced from said ceramic button.

9. The combination as specified in claim 7 wherein said lead wires are fixed with respect to the outer tubular member in position to normally hold the joined end of said lead wires spaced from the end of said tubular member.

10. A temperature sensor of the resistance wire type comprising an element support, said element support having a plurality of longitudinally extending holes therethrough positioned adjacent the periphery thereof, a continuous elongated resistance wire inserted through the holes in said element support, said resistance wire comprising a plurality of lengths of substantially straight wire extending through loops joining lengths in adjacent holes, each loop at at least one end of the support being spaced from said one end and being free to move relative thereto and each of said lengths being freely supported substantially over their entire length by the holes interior surface portions, lead wire means connected to opposite ends of said resistance wire, and means to retain said lead wire means from shifting with respect to said support, said resistance wire being unrestrained except where it is joined to said lead wire means.

11. A temperature sensor comprising an elongated tubular housing having a closed end and an opened end, a resistant wire support within said tube, said resistant wire support being comprised as a plurality of ceramic cylinders held in adjacent spaced relationship with a suitable filling of a metallic material contiguous to substantially the entire outer surface of each ceramic cylinder, each of said ceramic cylinders being provided with a plurality of longitudinally extending holes therethrough, a continuous resistance wire threaded through said holes, said resistance wire comprising a plurality of straight lengths within said holes and being looped between adjacent holes, the loops of said wire being spaced from said support at at least one end thereof, the straight length of wire in each hole being supported by the support portion defining the hole and being free to move with respect to said resistance wire support, lead wire means electrically and mechanically attached to the ends of said resistance wire, said lead wire means extending toward the open end of said tubular housing, means on the housing for restraining said lead wires from movement with respect to said resistance wire support, and means to retain said resistance wire support from movement toward the open end of the tube past a predetermined point.

12. The combination as specified in claim 11 wherein one of said ceramic support cylinders are shorter than the other and is spaced inwardly from the ends of the other ceramic cylinders adjacent the open end of said tube.

13. A temperature sensor of the resistance wire type comprising a support, said support being comprised as a center member having a plurality of outer elongated support members fixedly attached with respect thereto and extending substantially parallel therewith, said outer support members being arranged annularly around said center member, each of said support members having a plurality of holes extending longitudinally therethrough, a resistance wire threaded through the holes in said outer support members and looped between adjacent holes in the outer support members, the loops of said wire between adjacent holes being spaced from the end surfaces of the support members at one end thereof, said resistance wire comprising a plurality of substantially straight lengths extending between said loops, said lengths supported by the inner surfaces of said openings in said outer surfaces of said openings in said outer support members, and lead wires connected to opposite ends of said resistance wire, said resistance wire being otherwise unrestrained.

14. A temperature sensor of the resistance wire type comprising a support member having opposite ends and a plurality of longitudinally extending holes therethrough, a continuous resistance wire threaded through said holes, said resistance wire having more than two lengths of substantially straight wire extended through said holes, each of said lengths being freely supported substantially over its entire length by the respective hole interior surface, and at least one loop portion at either end of support joining the two lengths in adjacent holes, each loop portion at at least one end of the support being spaced from said one end and free to move relative thereto, lead wire means connected to opposite ends of said resistance wire, and means connected to said support member for retaining said lead wires from shifting with respect to said support member, said resistance wire being unrestrained except where it is connected to said lead wire means.

References Cited by the Examiner
UNITED STATES PATENTS

| | | | |
|---|---|---|---|
| 2,131,065 | 9/1938 | Obermaier | 338—28 |
| 2,641,239 | 6/1953 | Grinde et al. | 219—316 |
| 2,703,833 | 3/1955 | Vanvor | 338—25 |
| 3,005,171 | 10/1961 | Beckman | 338—28 |
| 3,061,806 | 10/1962 | Stevens | 338—28 |
| 3,114,125 | 12/1963 | Werner et al. | 338—28 |

RICHARD M. WOOD, *Primary Examiner.*

H. T. POWELL, W. D. BROOKS,
*Assistant Examiners.*